United States Patent [19]
Bell et al.

[11] Patent Number: 6,081,888
[45] Date of Patent: *Jun. 27, 2000

[54] ADAPTIVE MICROPROCESSOR WITH DYNAMICALLY RECONFIGURABLE MICROCODE RESPONSIVE TO EXTERNAL SIGNALS TO INITIATE MICROCODE RELOADING

[75] Inventors: Russell W. Bell, Austin, Tex.; Sherman Lee, Rancho Palos Verdes, Calif.; Paul R. Teich; Yan Zhou, both of Austin, Tex.

[73] Assignee: Advanced Micro Devices Inc., Sunnyvales, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 08/914,609

[22] Filed: Aug. 21, 1997

Related U.S. Application Data

[60] Provisional application No. 60/040,111, Mar. 7, 1997.
[51] Int. Cl.[7] ............................................. G06F 9/24
[52] U.S. Cl. ................................................. 712/248
[58] Field of Search ............................. 395/598; 712/248

[56] References Cited

U.S. PATENT DOCUMENTS

| | | | |
|---|---|---|---|
| 3,478,322 | 11/1969 | Evans | 395/598 |
| 3,792,441 | 2/1974 | Wymore et al. | 712/248 |
| 4,204,252 | 5/1980 | Hitz et al. | 395/598 |
| 4,346,438 | 8/1982 | Potash et al. | 395/598 |
| 5,144,242 | 9/1992 | Zilenga et al. | 324/312 |
| 5,237,667 | 8/1993 | Murakami et al. | 395/598 |
| 5,274,829 | 12/1993 | Hotta et al. | 395/598 |

*Primary Examiner*—Richard L. Ellis
*Attorney, Agent, or Firm*—Foley & Lardner

[57] ABSTRACT

An adaptive computing device includes a processing unit connected to receive instructions for execution and a random access memory storing microcode for access by the processing unit to carry out steps for executing the instructions. The microcode is loaded into the random access memory from a source of microcodes tailored for efficient execution of the instructions received by the processing unit. The adaptive computing unit may further include control logic responsive to the instructions for execution to request a loading of microcode into the random access memory from the source of microcodes. The adaptive computing unit may further include control logic responsive to signals generated external to the computing unit to request loading of microcode into the random access memory from the source of microcodes.

6 Claims, 2 Drawing Sheets

ADAPTIVE MICROPROCESSOR WITH DYNAMICALLY RECONFIGURABLE MICROCODE RESPONSIVE TO EXTERNAL SIGNALS TO INITIATE MICROCODE RELOADING

RELATED APPLICATIONS

This application claims priority to provisional application Ser. No. 60/040,111, filed Mar. 7, 1997.

BACKGROUND OF THE INVENTION

1. Field of the Invention

The invention relates to microcode driven microprocessors. More particularly, the invention relates to an adaptive microprocessor with dynamically reconfigurable microcode.

2. Description of the Related Art

Conventional complex instruction set computers (CISC) utilize microprocessors which execute a broad range of instructions. CISC instructions, also referred to as machine language instructions, typically require multiple clock cycles to execute. Each machine language instruction is executed by a series of smaller, internal operations that are driven by microcode. Conventionally, microcode is stored in a read-only memory (ROM) portion of the microprocessor on the same integrated circuit die as the rest of the microprocessor circuits.

A problem occurs because once the microcode is stored in ROM, the functionality of the microprocessor is inflexible. For example, a single machine language instruction always performs a single particular function.

A further problem occurs because as the microcode grows in size and complexity in order to execute all of the instructions required for a typical microprocessor application, an increase in die size results, as does a corresponding increase in power consumption of the device and decrease in the yield of satisfactory devices.

SUMMARY OF THE INVENTION

It is an object of the invention to overcome the above and other problems in conventional microprocessor applications. specifically, it is an object of the invention to reduce the die size of a microprocessor, thereby resulting in a power savings and improved yield. It is a further object of the invention to provide flexibility in the operation of a microprocessor. In particular, it is an object of the invention to provide an adaptive microprocessor wherein a machine language instruction may represent more than one function depending on the contents of a microcode control store.

Another object of the invention is to provide an adaptive microprocessor architecture which can dynamically adapt to processor loading and alter its characteristics depending on the tasks to be completed.

The above and other objects of the invention are accomplished by a first embodiment of an adaptive computing unit according to the invention which includes a processing unit connected to receive instructions for execution and a microcode random access memory (RAM) storing microcode for access by the processing unit to carry out steps for executing the instructions. The microcode is loaded into the microcode RAM from a microcode source which is tailored for efficient execution of the instructions for execution received by the processing unit.

The first embodiment according to the invention may further include control logic responsive to the instructions for execution to request loading of microcode into the microcode RAM from the microcode source.

A second embodiment of an adaptive computing unit according to the invention includes control logic responsive to signals generated external to the adaptive computing unit to request loading of microcode into the microcode RAM from the microcode source. The second embodiment also includes control logic to maintain operation of the adaptive computing unit during loading of the microcode RAM.

In either of the first and second embodiments, the microcode source may include a memory. In the first embodiment, the memory is part of the adaptive computing unit. In the second embodiment, the memory is external to the adaptive computing unit.

BRIEF DESCRIPTION OF THE DRAWINGS

These and other objects and advantages of the invention will be apparent from a review of the specification in light of the drawings, wherein.

DETAILED DESCRIPTION OF THE PREFERRED EMBODIMENTS

Figure 1:
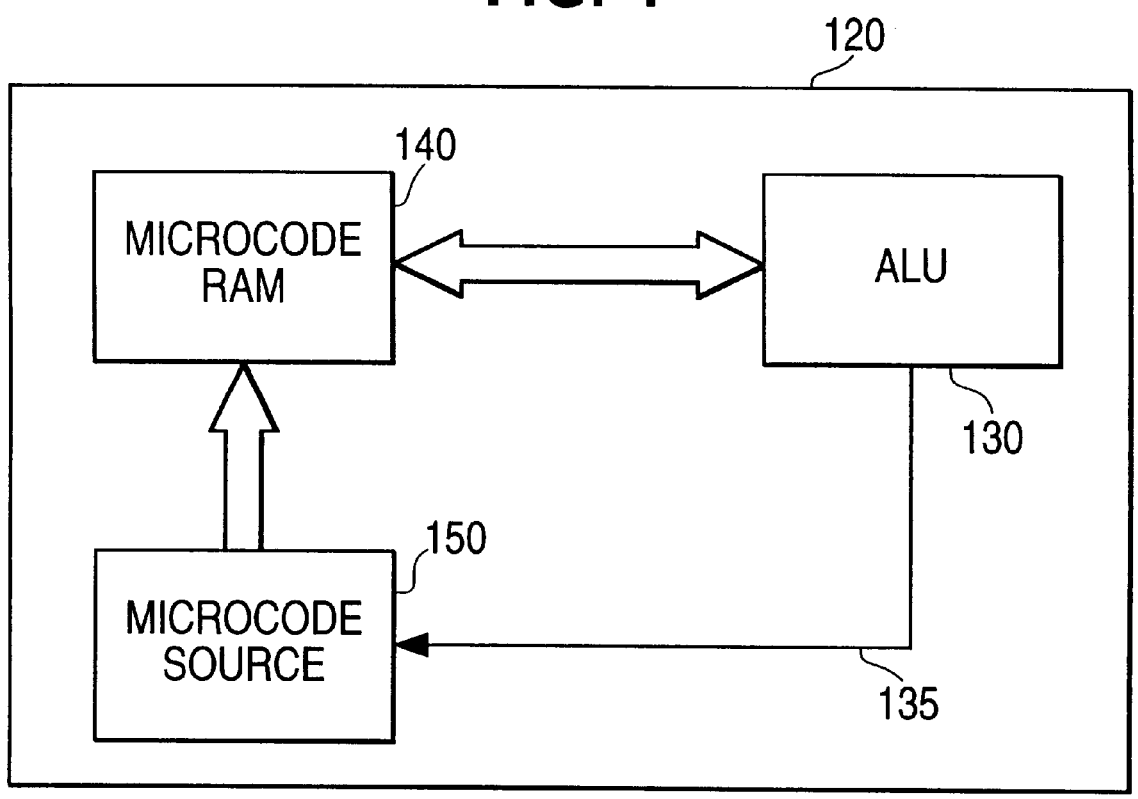
FIG. 1 is a block diagram of a first embodiment according to the invention.

A block diagram of a first embodiment of an adaptive computing device according to the invention is shown in FIG. 1. An adaptive computing device 120 includes a arithmetic logic unit 130 bi-directionality coupled with a microcode RAM 140. The microcode RAM 140 receives microcode from a microcode source 150. The microcode source 150 receives a control line 135 from the arithmetic logic unit 130. The arithmetic logic unit is a non-standard processor which provides enhanced access to its internal functions via microcode control bits. Preferably, all functions of the arithmetic logic unit 130 may be accessed by corresponding microcode control bits.

An example of the operation of the first embodiment, as shown in FIG. 1, is as follows. The arithmetic logic unit 130 receives instructions for execution from a currently executing application. The arithmetic logic unit 130 accesses the microcode RAM 140 for the microcode steps to execute the instructions. If the arithmetic logic unit 130 determines, for example, via control logic, that the instructions could be executed more efficiently with a different set of microcode, the arithmetic logic unit 130 provides an appropriate control signal on control line 135 to the microcode source 150. The microcode source 150 then loads microcode which is tailored for more efficient execution of the instructions into the microcode RAM 140, in accordance with the control signal.

An advantage is provided by the adaptive computing device 120 according to the invention because the architecture provides flexibility in the operation of the device. For example, a machine language instruction may represent more than one function depending on the contents of the microcode RAM 140. If the arithmetic logic unit 130 was performing a task that was, for example, predominantly arithmetic intensive, the machine language instructions would be targeted at manipulating numerical data. In this case, the microcode would provide the steps to instruct the arithmetic logic unit 130 to perform these tasks in the most efficient manner for arithmetic operations.

However, the very same adaptive computing device 120 could be used in a communications environment, in which the operations are directed, for example, to data movement, masking, and shifting. In this case, the microcode RAM 140 could be reloaded with a new set of microcode that would be used to interconnect and/or instruct the various sections of the arithmetic logic unit 130 to be more efficient at communications oriented tasks. In this case, some or all of the machine language instructions executed by the arithmetic logic unit 130 may be identical, in terms of digital representation, to those used for arithmetic processing, but the functions performed would be different because of the new set of microcode loaded in the microcode RAM 140.

In a further advantage of the adaptive computing device 120 according to the invention, the adaptive computing device 120 has the ability to adapt its "personality" dynamically. For example, a particular machine language instruction could instruct the arithmetic logic unit 130 to initiate a reloading of the microcode RAM 140 from the microcode source 150, thereby changing the entire personality of the arithmetic logic unit 130 to adapt to the appropriate problem.

Figure 2:
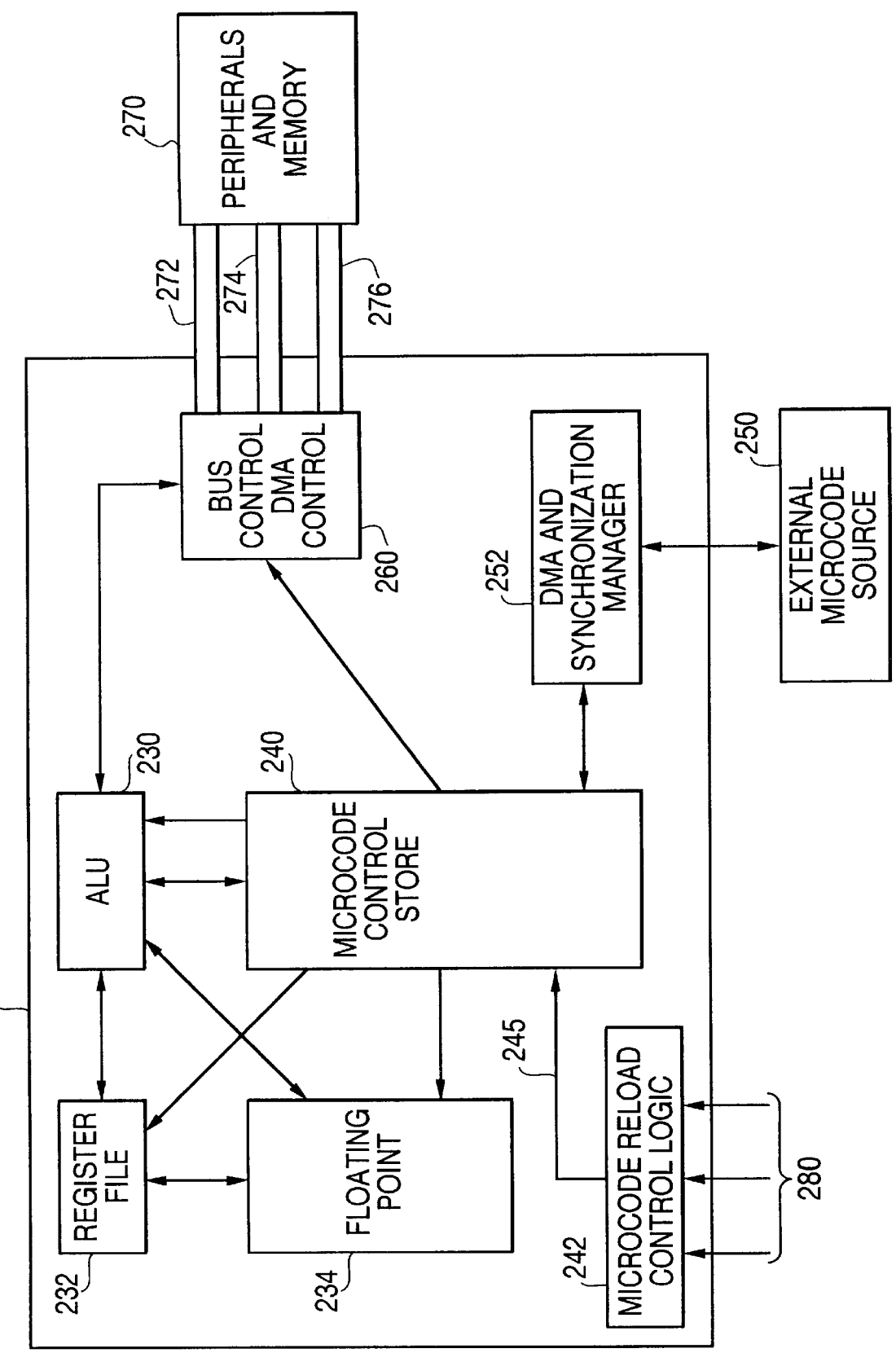
FIG. 2 is a block diagram of a second embodiment according to the invention.

FIG. 2 shows a more detailed block diagram of a second embodiment of an adaptive computing device according to the invention. An adaptive computing device 220 includes an arithmetic logic unit (ALU) 230 accessing microcode from a microcode control store 240.

The microcode control store 240 receives microcode from an external microcode source 250 via a direct memory access (DMA)/synchronization manager 252. The microcode control store 240 receives a control line 245 from microcode reload control logic 242. The microcode control store 240 provides microcode control lines to the ALU 230, a register file 232, a floating point unit 234 and a bus/DMA control unit 260.

The ALU 230 is interconnected with the register file 232, the floating point unit 234, and the bus/DMA control unit 260. The register file 232 is independently interconnected with the floating point unit 234.

The adaptive computing device 220 interfaces with the peripherals and memory section 270 via address lines 272, data lines 274, and control lines 276. The adaptive computing device 220 receives external hardware re-configuration inputs 280 into the microcode reload control logic 242.

An example of operation of the second embodiment of an adaptive computing device, as shown in FIG. 2, is as follows. Machine language instructions enter the adaptive computing device 220 from the peripherals and memory section 270 and follow through the bus/DMA control unit 260 to arrive at the ALU 230. The ALU 230 decodes the instruction and executes it by using a series of microcoded instructions that are stored in the microcode control store 240 and that are retrieved therefrom. The register file 232, floating point unit 234, and other functional blocks (not shown, but may be added as would be appropriate for a particular application) are accessed by the ALU 230, as needed, in performing execution of the instruction. Much of the control operation of the internal architecture is performed by the microcode control store 240. The microcode control store 240 contains control bits to instruct the ALU 230 and additional bits beyond those necessary to instruct the ALU 230, to connect various parts of the internal workings of the adaptive computing device 220 together.

Processing of machine language instructions continues until the adaptive computing device 220 needs to reconfigure itself or to change its "personality." The initiation of a personality change could be driven by a variety of stimuli, including, for example, an external event that signals the adaptive computing device 220 via the external hardware re-configuration inputs 280.

For example, external communications hardware could recognize the arrival of a high speed communications stream that requires specialized capabilities from the adaptive computing device 220. The external communications hardware would provide a signal on the external hardware re-configuration inputs 280 which instructs the adaptive computing device 220 to shift its functionality from its then current role to a communications centric processor. The microcode reload control logic 242 receives the signal and begins to prepare the adaptive computing device 220 to load new microcode.

The DMA/synchronization manager 252 transfers new microcode into the microcode control store 240 and utilizes synchronization hardware to assure that the adaptive computing device 220 can continue to run a limited set of instructions until the microcode has been reconfigured for its next task. Upon completion of the microcode reload, the ALU 230 is signaled to begin interpreting the new communications centric instructions that subsequently arrive via the peripherals and memory section 270.

In the case of the adaptive computing device 220 being fabricated on an integrated circuit, the external microcode source 250 would not be fabricated on the same die as the adaptive computing device 220. Thus, in addition to the advantages discussed above with respect to the first embodiment according to the invention, a further advantage is provided by the adaptive computing device 220 according to the invention because the microcode control store 240 requires a smaller microcode space on the die. A smaller microcode size provides the benefit of a smaller overall die size with a commensurate reduction in power consumption and increase in yield.

Other embodiments of the invention will be apparent to those skilled in the art from consideration of the specification and practice of the invention disclosed herein. It is intended that the specification be considered as exemplary only, with the true scope and spirit of the invention being indicated by the following claims.

What is claimed is:

1. An adaptive computing unit comprising:
   a processing unit connected to receive instructions for execution;
   a random access memory storing microcode for access by said processing unit to carry out steps for executing said instructions, said microcode being loaded into said random access memory from a source of microcodes tailored for efficient execution of said instructions for execution received by said processing unit; and
   control logic responsive to signals generated external to said adaptive computing unit to request loading of microcode into said random access memory from said source of microcodes,
   wherein said signals generated external to said adaptive computing unit are generated when a data rate of information input to said adaptive computing unit changes.

2. The adaptive computing unit as recited in claim 1, wherein said source of microcodes comprises a memory.

3. The adaptive computing unit as recited in claim 2, wherein said adaptive computing unit comprises said source of microcodes.

4. The adaptive computing unit as recited in claim 2, wherein said memory is external to said adaptive computing unit.

5. The adaptive computing unit as recited in claim 1, wherein said control logic maintains operation of said adaptive computing unit during loading of said random access memory by ensuring that said processing unit has at least a limited set of instructions available for execution in said random access memory.

6. The adaptive computing unit as recited in claim 1, further comprising a single integrated circuit having said processing unit and said random access memory fabricated thereon.

* * * * *